Aug. 4, 1925.
W. H. VOLCK
1,548,566
PROCESS OF EXTRACTING OR RECOVERING ALKALOIDS
Filed Oct. 22, 1921
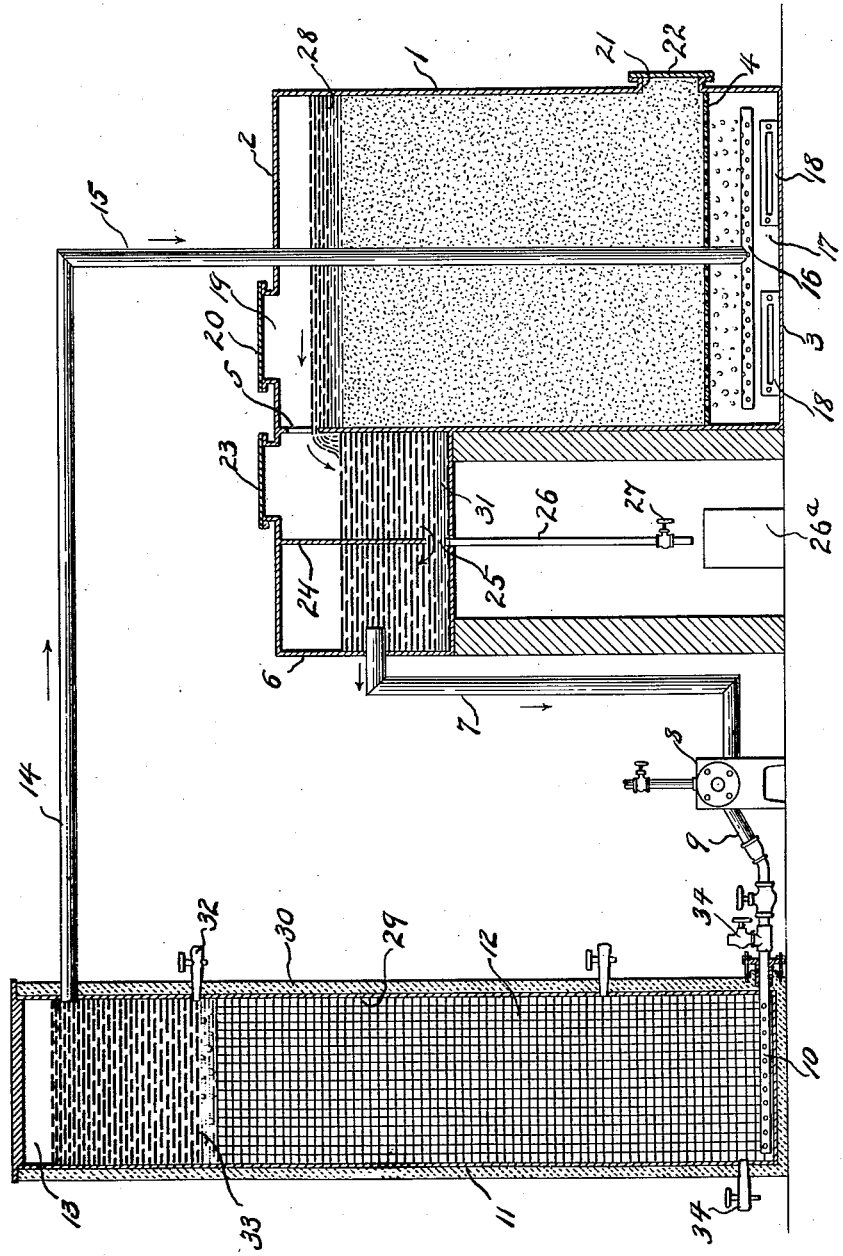
INVENTOR.
William N. Volck
BY Gifford Bull
his ATTORNEYS Patented Aug. 4, 1925.

1,548,566

UNITED STATES PATENT OFFICE.

WILLIAM H. VOLCK, OF WATSONVILLE, CALIFORNIA.

PROCESS OF EXTRACTING OR RECOVERING ALKALOIDS.

Application filed October 22, 1921. Serial No. 509,575.

*To all whom it may concern:*

Be it known that I, WILLIAM H. VOLCK, a citizen of the United States, residing at Watsonville, in the county of Santa Cruz and State of California, have invented certain new and useful Improvements in Processes of Extracting or Recovering Alkaloids, of which the following is a specification.

My invention relates to new and useful improvements in processes for the extraction or recovery of alkaloids from plant elements, and while it is capable of wide application in the extraction of various alkaloids from plant elements bearing or yielding the same, it will be found particularly useful in the extraction or recovery of alkaloids from nux vomica seeds, such alkaloids being strychnine and brucine, which may be further refined if necessary to produce pure strychnine.

The invention consists in the novel process to be fully described hereinafter and the novelty of which will be particularly pointed out and distinctly claimed.

In the accompanying drawings to be taken as a part of these specifications, I have shown in elevation and section an apparatus invented by me for performing said process and in connection with which said proccess will be described in its preferred embodiment, but I desire it understood that the said process is not to be limited in its scope to performance by said apparatus, as other apparatus may be employed.

Briefly stated, a preferred embodiment of my improved process includes the following steps or stages: first, the treatment of the plant element, in the present instance nux vomica seeds, to produce a solution and diffusion of the alkaloids in a liquid body or vehicle such as water, which is preferably maintained constantly alkaline; second, the removal of the diffused or dissolved alkaloids from solution by the absorptive action of a suitable substance, preferably a mineral oil such as a light grade of stove distillate, kerosene, light lubricating oil (or any substance having similar properties, such as chloroform, carbon tetrachloride, and vegetable and mineral oils); the removal or recovery of the alkaloids from the mineral oil, or its equivalent, this being accomplished preferably by the use of acidified water; and, fourth, the precipitation of the desired alkaloids from the solution of their salts in the acidified water, by the use of a suitable precipitating agent, for example, caustic soda or other alkalies. The filtrate so obtained is then filtered, washed and dried, and in its dried condition comprises practically pure mixed alkaloids of nux vomica, and in this form is useful in the manufacture of poisons for the extermination of rodents.

The composition of the mixture of alkaloids constituting the final product depends on the proportion in which they occur in the nux vomica seeds, which is known to be somewhat variable. In actual working of this process by me the alkaloid product shows the following approximate composition:

| | Per cent. |
|---|---|
| Strychnine | 45 to 50 |
| Brucine | 40 to 45 |
| Various impurities | 5 to 10 |

It will be understood that the product of mixed alkaloids is not only useful as rodent poison, but is also useful as a source of pure strychnine which may be obtained by purifying the mixed product to eliminate the brucine and impurities.

I will now proceed to describe in detail a preferred embodiment of the process, and the apparatus also of my invention for practicing the same, reference being made to the accompanying drawing:

1 designates a diffusion or solution chamber in the form of a tank of suitable dimensions and capacity, the same being provided with a cover or top 2, bottom 3 and a perforated false bottom 4. The tank 1 is provided at its upper portion with an outlet port 5, communicating with an oil settling receptacle 6. The oil settling tank is connected by an outflow conduit 7 with the inlet side of a suitable pump 8, the outlet side of which is connected to a pipe 9, which leads to and discharges through a suitable perforated pipe system 10, in the bottom of a concentrating chamber or tower 11. This concentrating chamber 11 is filled from the bottom portion thereof to a point spaced from the top thereof with intercepting means or elements, preferably in the form of spiral tower packing 12, to intercept and break up the flowing liquid into fine streams, or films, for a purpose to be presently described. The space 13 between the upper portion of the packing 12, and top wall of the chamber 11, constitutes an oil circulating chamber, said chamber being connected by a pipe 14, with a vertical pipe 15 extending centrally through the tank 1, and communicating at its lower end with a perforated distributing pipe system 16, located in the space 17 beneath the perforated false bottom 4. The tank 1 is provided with heating means, preferably consisting of steam coils or radiators 18, located in the space 17, and said tank is also provided with a filling port 19 having a suitable detachable cover 20, and an outlet or dumping port 21 provided with a suitable detachable closure 22.

The oil settling chamber 6 is provided with a suitable observation port 23, and the interior of said chamber is divided into two parts by a vertical partition 24 extending from the top of the said chamber to a point short of the bottom thereof to provide a flow space 25. The chamber 6 is also provided with a drain 26 controlled by a hand valve 27 by means of which drain water may be drained from the chamber 6. The oil conduit 7 connects with the oil settling tank 8 at a point well above the water-settling space, so that the water will not find access to said conduit.

When employing the apparatus just described, my novel process in its preferred embodiment is carried out as follows: The material from which the alkaloid is to be recovered, in the present instance nux vomica seeds which have been cleaned preferably by winnowing to remove any dust or trash which may be present, are placed in the tank 1, through the port 19 and the cover 20 fastened in place. The quantity of seeds introduced into the tank 1 is so regulated that when they increase in bulk by swelling in water, the level will not raise to a point nearer than six inches approximately from the bottom of the port 5. The level of the swelled seeds is regulated so as to insure a water and oil space in the tank above the seeds.

After the proper quantity of the raw material, for example, nux vomica seeds, have been placed in the diffusion tank 1, the latter is filled with water to the water level 28—that is, preferably slightly above the upper surface of the seeds, and heat is applied to the mass through the steam heaters or radiators 18, heretofore described. The mass of seeds and water is heated and soaked for a period preferably from twelve to sixteen hours, which serves to swell the seeds to their maximum dimensions. When the swelling of the seeds is complete, or has reached the desired point, the mass is rendered alkaline by addition of a quantity of sodium bicarbonate, sufficient to neutralize the organic acids in the nux vomica seeds, and maintain a slight excess alkalinity. The sodium bicarbonate is preferably thrown in in dry condition on top of the mass of seeds where it dissolves and distributes uniformly through the contents of the tank. The quantity of sodium bicarbonate required in practice is about one pound to each forty pounds of seeds. Other alkalies, such as caustic soda, sodium carbonate, ammonia and quicklime, may be used, but sodium bicarbonate is preferred on account of its very mild action on organic matter. While the mass of seeds is being treated in the manner just described, the concentrating tank 11 is filled with water to the water level 33, which is regulated by the test cock 32. The oil circulating system through tanks 1 and 6, the pump 8, tower 11 and connections 7, 9, 14 and 5, is then filled with a mineral oil, preferably kerosene. In operating this process I prefer to employ a stove distillate (a clear reddish-colored oil about 30° Baumé). The oil in the circulating system described is then set in motion by means of the pump 8, and as soon as this circulation is established, and is seen to be working properly, a mineral acid, such as phosphoric or sulphuric acid, is introduced into the concentrating tank 11. The quantity of acid used at the start is sufficient to make about one-half of one per cent to one per cent concentration with the water in the said concentrating tank 11. For this purpose, phosphoric acid is preferred, on account of its mild action towards organic matter, and its less corrosive action on the perforated pipe system 10 as compared with sulphuric acid. The concentrating tank is made of an inner shell of wood 29 encased in a concrete outer wall 30, and the spiral tower-packing 12 is of a refractory material. After the circulation of the oil is established, it is kept continuously in motion and maintained at a temperature of about 70° C., preferably by the heat applied through the steam heaters or radiators 18, in the bottom of the diffusion tank 1. The temperature is maintained above normal, or ordinary temperatures, first, in order to increase the rate of diffusion of the alkaloids in the alkaloid tank 1; second, to increase the solubility of these alkaloids in mineral oil or other absorbent employed, and, third, to reduce the viscosity of the mineral oil so that it flows readily, settles clear in the oil settling tank 6 and its likelihood to form emulsions in the system is reduced as far as possible. The circulation is maintained at as rapid a rate as is consistent with these conditions. The small globules of water which are carried through the port 5 with the circulating oil, settle to the bottom of the oil settling tank 6 and accumulate in the space 31, from where the water may be withdrawn from time to time through the water-drain 26, collected in a suitable receptacle 26ª, and returned to the diffusion tank 1 for further use. The oil from the tank 6, and carrying with it the alkaloids, then passes through the pipe 7, pump 8, and perforated pipe system 10, up through the liquid in the tower 11.

When the circulating oil carrying the absorbed alkaloid matter enters the concentrating tank 11 through the perforated pipe system 16, it is again broken up into very fine streams by said system and the packing 12 in the tower 11 and is thereby brought into extended surface contact with the said acid solution, heretofore described, in the tower 12 and surrounding the packing 12. By this means the alkaloids in the circulating oil are transferred to the acid solution in the tower 11 in the form of salts of strychnine, and of brucine. The acidity of the acid solution in the concentrating tank 11 is maintained by the addition of further quantities of acid from time to time, as may be determined by the test of samples drawn from the test valve or gauge cock 32, heretofore described.

The circulating oil after passing upwards through the tower 11 in the manner described, and having given up the alkaloids to the acid solution, forms a layer in the upper portion of the tower above the acid solution, as clearly indicated in the drawings. The oil flows from the upper end of the tower through the pipes 14 and 15, down into the space beneath the partition 4 in the tank 1, the oil being distributed in fine streams in said chamber 17 by the distributing pipe system 16 and passing upwards through the mass of nux vomica seeds in said tank 1, the fine streams of oil presenting a large surface of oil to the mass in the tank 1. By this operation, the alkaloids are removed from the water solution and the mass in the tank 1 and are constantly replaced in the solution by the diffusion of more alkaloids from the mass of nux vomica seeds in said tank.

From the above description it will be seen that the circulating oil stream constitutes a continuous carrier or conveyor which takes up the alkaloids from the tank 1 and transfers the same to the concentrating tank or tower 11. This method of procedure results in an extremely rapid extraction or recovery, inasmuch as I have shown by actual operation that seventy-five per cent of the alkaloids in the nux vomica seeds may be removed in thirty-six hours, and ninety per cent in forty-eight hours. If it is desired to extract the remaining ten per cent, which is more resistant, it takes from one hundred to one hundred and fifty hours to remove the last traces of strychnine. Complete exhaustion of the seeds is determined by chewing the same, which, when exhausted, no longer give the characteristic bitter taste.

While I have shown in the drawings a single diffusion tank 1, it is obvious that a battery of the same may be employed, some of which are passing through and completing the operation while others are starting, in order to provide for the most economical manipulation of the process.

While the contruction and proportion of the apparatus may be varied, I will give the dimensions and capacities of an apparatus which I have constructed and operated. In this apparatus used by me, the diffusion tank 1 is approximately twelve feet in diameter and ten feet in height, having a normal capacity of fifteen thousand pounds of nux vomica seeds and an extreme capacity of eighteen thousand pounds. The concentrating chambers or towers 11 are four in number, each sixteen feet high and three feet six inches in internal diameter. These tanks are so connected to the diffusion tank 1 by the pipes, that they may be operated together or independently, so that one or more may be emptied or refilled without stopping the circulation of oil through the others. It will be understood that suitable hand-valves may be interposed in the various pipes of the apparatus to regulate the flow of oil or its equivalent. These tanks or towers 11 contain spiral tower packing, preferably to the height of twelve feet, and the space surrounding this packing holds two hundred and fifty gallons of acid solution in each tower. The alkaloids from fifteen thousand to eighteen thousand pounds of nux vomica seeds are then concentrated as salts in one thousand gallons of acid solution (when four towers 11 are employed). When the extraction is complete, the acid solution of alkaloid salts is drawn off from the tank 11 through a drain valve 34, in any suitable receptacles not shown, and the alkaloids precipitated with caustic soda, the precipitated alkaloids then filtered, washed and dried, in any suitable manner, when they are then ready for use as a rodent poison, or for refining into pure strychnine. It will be understood that the circulation of oil through the tower 11 is stopped when it is desired to withdraw the solution of alkaloid salts from said tower, sufficient time being permitted to elapse to insure stratifying of the oil above the solution, as indicated in the drawings, so that the oil will not be drawn from the system with the alkaloid solution.

The operation of the process is simple and can be performed by a single operator. The mineral oil is not consumed in the process but is recovered and used over again until it finally becomes charged with resins and oily matter from the nux vomica seeds, when it may be discarded or used as fuel oil.

While the process is designed to extract nux vomica alkaloids, and this is the use for which I have employed it, it is applicable to the recovery of nicotine, cocaine and other alkaloids. In the latter cases, no essential modifications of the process above set forth are necessary.

What I claim and desire to secure by Letters Patent of the United States is:—

1. A process for the extraction of alkaloids, which consists in treating solid raw material with a suitable aqueous solvent to form a solution bearing the alkaloids, treating said solution while still in contact with said solid raw material with a liquid absorbent material non-miscible with the solution and capable of taking up the alkaloids, withdrawing the alkaloid-bearing liquid material from the solid raw material, and recovering the alkaloid from said liquid material.

2. A process for the extraction of alkaloids, which consists in treating solid raw material with a suitable aqueous solvent to form a solution bearing the alkaloids, treating said solution while still in contact with said solid raw material with a liquid absorbent material non-miscible with the solution and capable of taking up the alkaloids, withdrawing the alkaloid-bearing liquid material from the solid raw material, treating the absorbent material with acid to form a solution of the salt of the alkaloids, and precipitating the alkaloid from its salt solution.

3. A process for the extraction of alkaloids, which consists in treating the raw material with water to form a solution bearing the alkaloids, treating said solution while in contact with said material with a liquid absorbent material capable of taking up the alkaloids, withdrawing the alkaloid-bearing liquid material from the raw material, and recovering the alkaloid from said liquid material.

4. A process for the extraction of alkaloids, which consists in treating the raw material with water at a temperature above 50° C. to form a solution bearing the alkaloids, treating said solution while in contact with said material with a liquid absorbent material capable of taking up the alkaloids, withdrawing the alkaloid-bearing liquid material from the raw material, and recovering the alkaloid from said liquid material.

5. A process of extracting alkaloids which consists in forming a water solution from the plant element, separating the alkaloids from the solution by diffusing oil in contact with the solution, treating the alkaloid-bearing oil to form a salt of the alkaloids, and recovering the alkaloid by treating the salt solution with alkali.

6. A process of extracting alkaloids which consists in forming a water solution from the plant element, separating the alkaloids from the solution by diffusing mineral oil in contact with the solution, treating the alkaloid-bearing oil to form a salt of the alkaloids, and recovering the alkaloid by treating the salt solution with alkali.

7. The process of extracting alkaloids, which consists in placing the plant material in a vessel, treating the same at a temperature above 50° C. with a solvent to extract the alkaloids treating the mass with alkali to neutralize organic acids and render the mass slightly alkaline, passing a mineral oil through said mass to absorb the alkaloids, passing the alkaloid-bearing oil through the acid solution to recover the alkaloids in the form of a salt solution, and precipitating the alkaloid from the salt solution.

8. The process of extracting alkaloids, which consists in placing the plant material in a vessel, treating the same at a temperature above 50° C. with a solvent to extract the alkaloid, treating the mass with alkali to neutralize organic acids and render the mass slightly alkaline, passing a mineral oil through said mass to absorb the alkaloids, passing the alkaloid-bearing oil through phosphoric acid solution to recover the alkaloids in the form of a salt solution, and precipitating the alkaloids from the salt solution.

9. The process of extracting alkaloids, which consists in placing the plant material in a vessel, treating the same at a temperature above 50° C. with a solvent to extract the alkaloids, treating the mass with a mild alkali to neutralize organic acids and render the mass slightly alkaline, passing a mineral oil through said mass to absorb the alkaloids, passing the alkaloid-bearing oil through acid solution to recover the alkaloids in form of a salt solution, and precipitating the alkaloids from the salt solution.

10. A process for extracting alkaloids, which consists in treating the plant element with water to make a solution of the alkaloids, circulating a hydrocarbon oil in contact with said solution to absorb alkaloids therefrom, and treating the circulating oil at a point removed from the water solution with acid to form a salt of the alkaloids.

11. A process for extracting alkaloids, which consists in treating the plant element with water to make a solution of the alkaloids, circulating a hydrocarbon oil in contact with said solution to absorb alkaloids therefrom, and circulating the oil bearing the alkaloids through acid to thereby recover the alkaloids in the salt from the oil.

12. A process for extracting alkaloids, which consists in treating the plant element with water to make a solution of the alkaloids, circulating a hydrocarbon oil in contact with said solution to absorb alkaloids therefrom, circulating the oil bearing the alkaloids through acid to thereby recover alkaloids in salt form from the oil, and returning said oil into contact with said water solution to further absorb alkaloids therefrom.

13. A process for extracting alkaloids, which consists in placing the alkaloid containing material in a suitable vessel, treating the material in said vessel with water to form a solution of alkaloids, passing oil through said vessel and in contact with the material and said solution to absorb alkaloids, and recovering the alkaloids in form of salts from said oil.

14. A process for extracting alkaloids, which consists in placing the alkaloid containing material in a suitable vessel, treating the material in the vessel with water to form an alkaloid solution, passing oil through said vessel and in contact with the material and said solution to absorb alkaloids, withdrawing the alkaloid-bearing oil from said vessel, and passing said oil through a chamber containing an agent recovering the alkaloids from the oil, and then returning the oil into said first-named vessel.

15. A process for extracting alkaloids from nux vomica seeds, which consists in treating the seeds with water above 50° C. to form a solution of the alkaloids in the water, passing hydrocarbon oil in contact with and through such solution to absorb the alkaloids therefrom, and recovering the alkaloids from the hydrocarbon oil.

16. A process for extracting alkaloids from nux vomica seeds, which consists in treating the seeds with water above 50° C. to form a solution of the alkaloids in water, passing hydrocarbon oil in contact with and through such solution and the seeds to absorb the alkaloids therefrom, and recovering the alkaloids from the hydrocarbon oil.

17. A process for extracting alkaloids from nux vomica seeds which consists in treating the seeds with water above 50° C. to form a solution of the alkaloids in water, passing a hydrocarbon oil in contact with the solution and the seeds to absorb the alkaloids therefrom, treating the hydrocarbon oil bearing the alkaloids with acid to form salts of the alkaloids and precipitating the alkaloids from the salts thereof by treatment with alkali.

18. A process for extracting alkaloids, which consists in treating the alkaloid containing material with water to form an alkaloid solution, continuously circulating a mineral oil through the mass of material and said solution to absorb the alkaloids, passing the mineral oil carrying the alkaloids through acid forming salts of the alkaloids, and returning the oil through said mass in a cyclic manner to again absorb alkaloids from said mass.

19. A process for extracting alkaloids from plant material which consists in subjecting the plant material to water to liberate the alkaloids from such material, passing an absorbing fluid through the mass of water and material, removing the alkaloid-bearing absorbing fluid from said mass, and separating the alkaloids from said fluid.

20. A process for extracting alkaloids from plant material which consists in subjecting the plant material to water to liberate the alkaloids from such material, passing an absorbing fluid through the mass of water and material, removing the alkaloid-bearing absorbing fluid from said mass, and separating the alkaloids in the form of a salt solution from said fluid.

21. A process for extracting alkaloids from plant material which consists in subjecting the plant material to water to liberate the alkaloids from such material, passing an absorbing fluid through the mass of water and material, removing the alkaloid-bearing absorbing fluid from said mass, and separating the alkaloids in the form of a salt solution from said fluid, and treating said solution with alkali to recover the alkaloids.

22. A process for extracting alkaloids from plant material which consists in subjecting the plant material to water to liberate the alkaloids from such material, passing an absorbing fluid through the mass of water and material, removing the alkaloid-bearing absorbing fluid from said mass, separating the alkaloids from said fluid and again passing the fluid through said mass.

23. The process of extracting alkaloids from plant material, which consists in treating said material with water to take up alkaloids therefrom, continuously contacting mineral oil with the alkaloid-bearing water under conditions whereby the oil takes up the alkaloids from the water, continuously removing the alkaloid-bearing oil from the presence of the alkaloid-bearing water, and continuously contacting the removed alkaloid-bearing oil with a liquid medium recovering the alkaloids from said oil.

24. The process of extracting alkaloids from plant material, which consists in treating said material with water to take up alkaloids therefrom, continuously contacting mineral oil with the alkaloid-bearing water under conditions whereby the oil takes up the alkaloids from the water, continuously removing the alkaloid-bearing oil from the presence of the alkaloid-bearing water, and continuously contacting the removed alkaloid-bearing oil with a liquid medium by flowing said oil through said medium whereby the alkaloid is transferred from the oil to said medium.

25. The process of extracting alkaloids from plant material, which consists in treating said material in water to take up alkaloids therefrom, continuously contacting mineral oil with the alkaloid-bearing water under conditions whereby the oil takes up the alkaloids from the water, continuously removing the alkaloid-bearing oil from the presence of the alkaloid-bearing water, and continuously contacting the removed alkaloid-bearing oil with an acid liquid medium, recovering the alkaloid in salt form from said oil, and treating the alkaloid salt with alkali to precipitate the alkaloid.

In testimony whereof I have hereunto signed my name in the presence of the suscribing witnesses.

WILLIAM H. VOLCK.

Witnesses:
BERNICE HUNTSMAN,
C. E. McSHERRY.